Dec. 8, 1925.

J. W. FORD

CHILD'S WHEELED VEHICLE

Filed Dec. 14, 1923

J. W. Ford, Inventor

Dec. 8, 1925.  
J. W. FORD  
1,564,548  
CHILD'S WHEELED VEHICLE  
Filed Dec. 14, 1923  
2 Sheets-Sheet 2
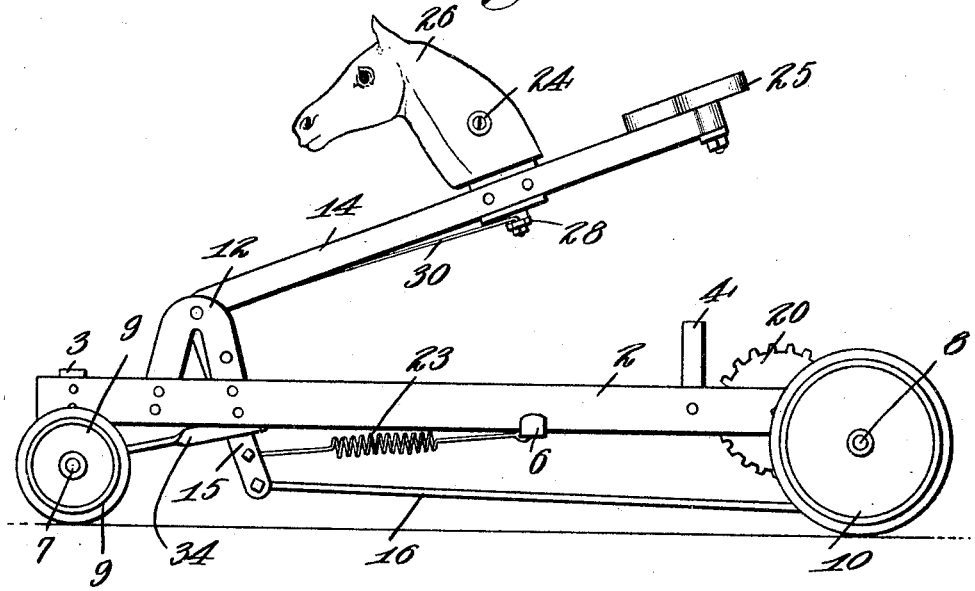
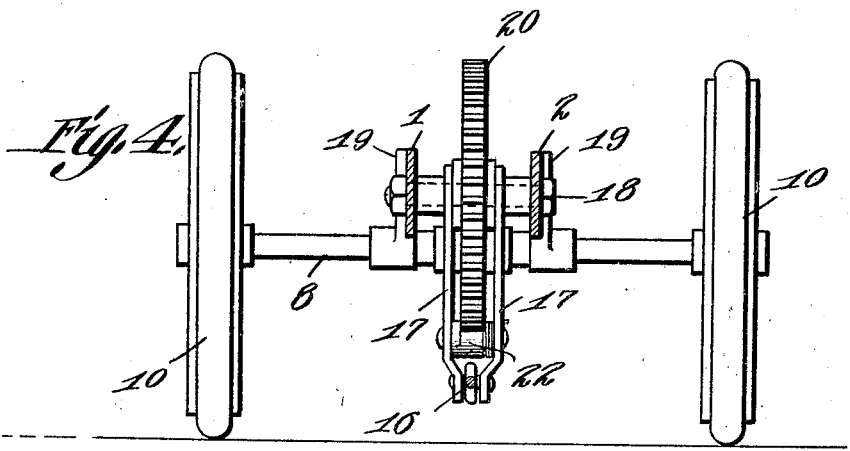
Inventor  
J. W. Ford  
By C. A. Snow & Co.  
Attorneys Patented Dec. 8, 1925.

1,564,548

UNITED STATES PATENT OFFICE.

JAMES W. FORD, OF GALESBURG, ILLINOIS.

CHILD'S WHEELED VEHICLE.

Application filed December 14, 1922. Serial No. 680,675.

*To all whom it may concern:*

Be it known that I, JAMES W. FORD, a citizen of the United States, residing at Galesburg, in the county of Knox and State of Illinois, have invented a new and useful Child's Wheeled Vehicle, of which the following is a specification.

This invention relates to children's vehicles and more particularly to manually operated wheeled riding vehicles of this character.

The object of the invention is to provide a vehicle so constructed that a child moving up and down on the seat of the vehicle will produce the necessary power for driving the vehicle, suitable mechanism being provided for transmitting the power to the driving wheels.

Another object is to provide simple and efficient steering mechanism for such a vehicle which may be readily operated by a child.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Fig. 3 is a side elevation of the vehicle; and

Fig. 4 is a transverse section taken on the line 4—4 of Fig. 1.

Figure 1:
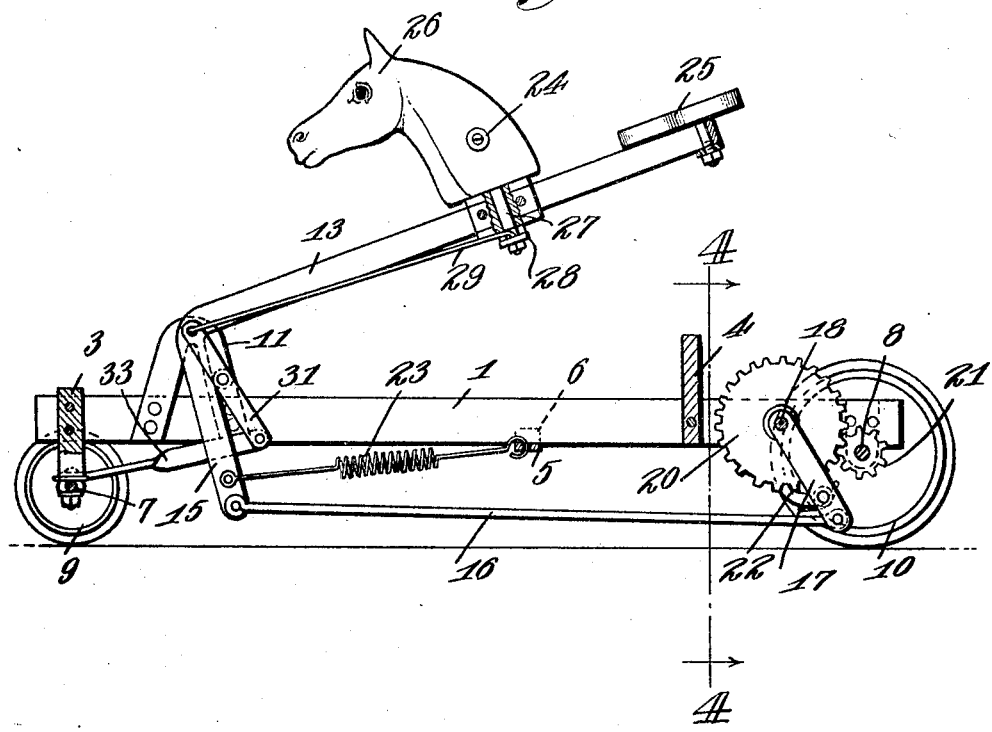
Figure 1 represents a longitudinal section of the vehicle constructed in accordance with this invention.
Figure 2:
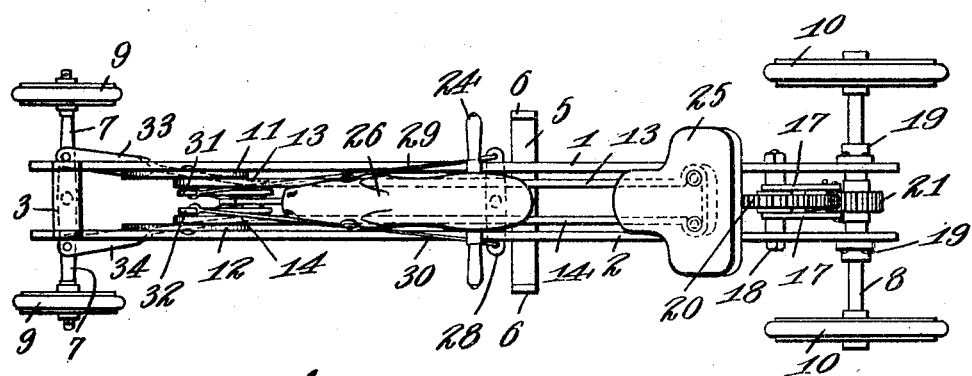
Fig. 2 is a top plan view.

The vehicle constituting this invention comprises a body portion composed of two side bars 1 and 2 connected at their front and rear ends by cross bars 3 and 4 respectively. A foot rest 5 extends transversely across the body spanning the space between the cross bars 1 and 2 and projecting at its ends beyond said bars as shown clearly in Fig. 2, said projecting ends having upturned terminals 6 to form stops to prevent the child's feet from slipping off the rest.

Front and rear axles 7 and 8 are mounted at the front and rear of the body having the usual front steering wheels 9 and rear driving wheels 10.

Inverted V-shaped brackets 11 and 12 are riveted to the inner faces of the side bars 1 and 2 and to the apices of which are pivotally connected seat levers 13 and 14 in the form of bell cranks the shorter arms 15 of which extend downwardly and are connected by rods as 16 with links 17 pivoted to a cross shaft 18 mounted in the rear portion of the frame in suitable bearings shown at 19. A gear wheel 20 is also carried by shaft 18 and meshes with a cog wheel 21 fixed to the rear axle 8 so that motion imparted to the wheel 20 will be transmitted through the cog wheel 21 to the rear driving wheels 10.

A ratchet 22 is mounted between the links 17 and engages the gear wheel 20 so that the reciprocation of the ratchet by means of the rods 16 will operate to turn the gear 20.

A coiled spring 23 connects each of the bell cranks 15 to the side bars 1 and 2 at points in the rear of the bell cranks and these springs exert their tension to return the seat 25 to raised or normal position after it has been depressed. The seat 25 is mounted on the rear ends of the levers 13 and 14 and is vertically movable to impart motion to the driving wheels of the vehicle through the means above described.

The steering mechanism for this vehicle comprises a handle bar 24 which is here shown passed through a horse's head 26 so that when the handle bars turn the head will be turned with them.

This handle bar has a depending right angular shank 27 extending downwardly through the neck of the horse and secured to a cross bar or link 28 which projects at opposite ends into planes beyond the seat levers and which ends are apertured for the reception of steering rods 29 and 30.

These rods 29 and 30 cross each other and are connected at their front ends to upstanding links 31 and 32 which are pivoted intermediate their ends on the rear arms of the brackets 11 and 12. The lower ends of the links 31 and 32 are pivotally connected with the rear ends of links 33 and 34 said last mentioned links being connected with the front axle 7 so that the lateral shifting or turning of the handle bar 24 will steer the front wheels according to the direction the bar is turned.

In the use of this vehicle the child straddles the seat levers 13 and 14 and stands on the foot rest 5 resting his weight on the seat 25. To propel the vehicle he moves up and down on the seat 25 in a manner similar to riding a horse so that when the seat 25 is depressed motion will be transmitted to the driving wheels 10 through the ratchet 22 and when the weight of the child is removed from the seat when he stands in the stirrups or foot rest 5 the coiled springs 22 will operate to return the seat to raised position the ratchet 22 riding freely over the teeth of gear 20 during this operation.

I claim:—

1. In a vehicle of the class described, a wheel supported frame, a bell crank lever fulcrumed on said frame, a seat carried by said lever, gears connected to drive one set of wheels and a rod and link connection between the bell crank and one of the gears whereby rotary motion is imparted to the gear on the vertical movement of the seat.

2. In a vehicle of the class described, a wheel supported body, a bell crank lever fulcrumed on said body and having one arm extended rearwardly and the other downwardly, a seat carried by said rearwardly extended arm, pawl and ratchet mechanism connected with one set of said wheels, a rod connecting the lower arm of the bell crank with said ratchet whereby the depression of the seat will rotate the wheels, and a coiled spring connecting said bell crank with said body and exerting its tension to elevate the seat on removal of pressure therefrom.

3. In a vehicle of the class described, a wheel supported body, brackets carried by the front portion of the body and extending upwardly therefrom, a bell crank lever fulcrumed on said brackets and having one arm extending rearwardly and equipped with a seat at its free end, a rod pivotally connected at one end with the free end of the other arm, a link connected with the other end of said rod, meshing gears connected with one set of said wheels, said link being connected with one of said gears and having a pawl for engaging one of the gears whereby the depression of the seat will actuate the gears to turn the wheels, and means for returning the seat to raised position on the removal of pressure therefrom.

4. In a vehicle of the class described, a wheel supported body, means operable by the occupant to propel said vehicle, steering mechanism connected to actuate the front wheel and comprising a cross bar pivotally mounted on said body, steering rods connected in the ends of said cross bar and crossing each other midway their length, links pivoted intermediate their ends on said body and connected at their upper ends with said rods, and links pivotally connecting the lower ends of said first mentioned links with the front axle whereby lateral shifting or turning of the cross bar will steer the front wheels according to the direction the bar is turned.

In testimony that I claim the foregoing as my own, I have hereto affixed my signature.

JAMES W. FORD.